United States Patent [19]

Merz

[11] 4,019,641
[45] Apr. 26, 1977

[54] ELEVATING AND CONVEYING SYSTEM FOR UNLOADING VESSELS OR THE LIKE

[75] Inventor: Walter Merz, Allmendboden, Switzerland

[73] Assignee: Schweizerische Aluminium AG, Chippis, Switzerland

[22] Filed: Oct. 21, 1975

[21] Appl. No.: 624,191

Related U.S. Application Data

[63] Continuation-in-part of Ser. No. 426,742, Dec. 20, 1973, abandoned, which is a continuation of Ser. No. 201,517, Nov. 23, 1971, abandoned.

[30] Foreign Application Priority Data

Dec. 2, 1970   Switzerland ............... 17863/70

[52] U.S. Cl. .................. 214/14; 214/89; 214/152; 302/12; 302/59
[51] Int. Cl.² ........................... B63 27/24
[58] Field of Search ............ 302/11, 12, 17, 31, 302/58, 59; 214/13, 14, 15 D, 15 E, 12, 89, 152

[56] References Cited

UNITED STATES PATENTS

| | | | |
|---|---|---|---|
| 557,059 | 3/1896 | Dodge | 302/31 |
| 2,620,236 | 12/1952 | Jakobsen | 302/59 |

FOREIGN PATENTS OR APPLICATIONS

| | | | |
|---|---|---|---|
| 1,217,826 | 12/1970 | United Kingdom | 214/13 |

*Primary Examiner*—Robert J. Spar
*Assistant Examiner*—George F. Abraham
*Attorney, Agent, or Firm*—Lawrence Rosen; E. Janet Berry

[57] ABSTRACT

Elevating and conveying system and method for unloading vessels, or the like, comprising: a vertical pneumatic pipe having a lower end adapted for being positioned in the particulate material to be removed from the vessel, or the like; an approximately horizontal conveyor; a joining chamber between the horizontal conveyor and the vertical pipe; the vertical pipe has a smaller cross-sectional area and the horizontal pipe has a larger cross-sectional area, such that material suctioned up the vertical pipe will settle out from the air flow as it moves into the horizontal pipe; the joining chamber is enlarged for reducing air flow velocity and redirecting the flow of air and material; a conveyor means in the horizontal conveyor, such as a fluidizing conveyor, a mechanical conveyor, or the like.

24 Claims, 8 Drawing Figures

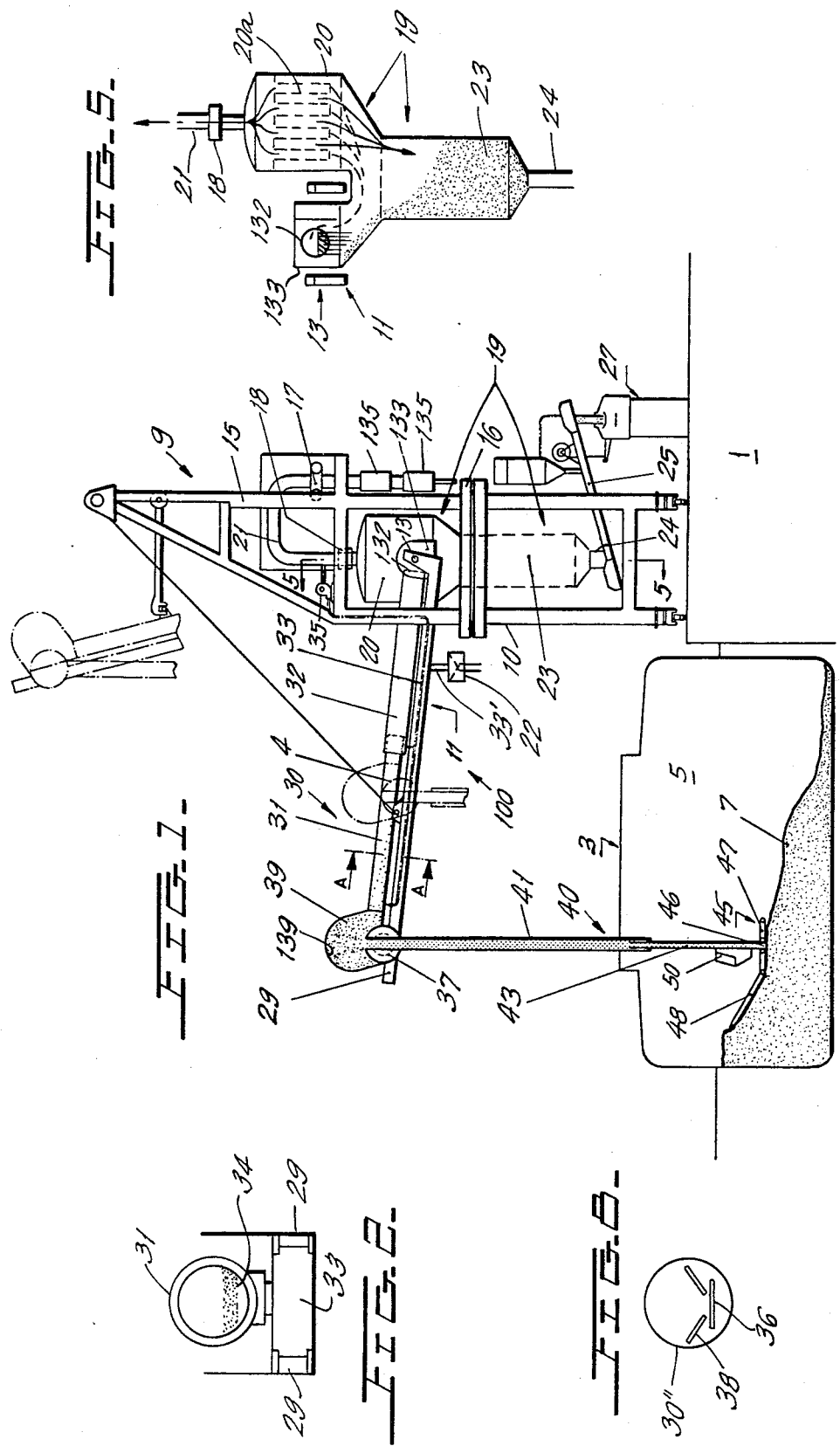

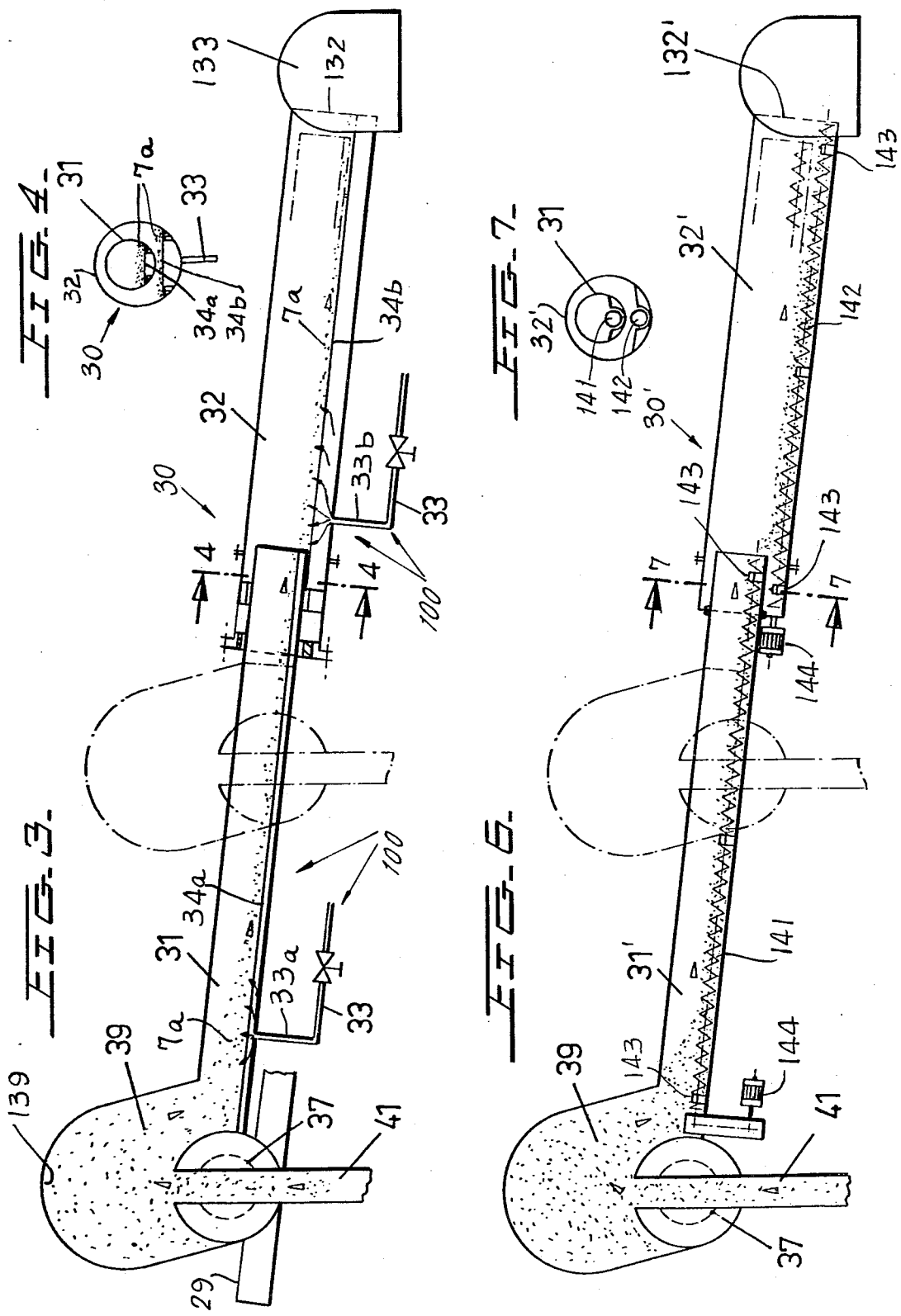

ELEVATING AND CONVEYING SYSTEM FOR UNLOADING VESSELS OR THE LIKE

RELATED APPLICATIONS

This is a continuation-in-part of application Ser. No. 426,742, filed Dec. 20, 1973, now abandoned, which was a continuation of Ser. No. 201,517, filed Nov. 23, 1971, now abandoned.

BACKGROUND OF THE INVENTION

The present invention relates to a system and method wherein cargo, such as particulate material, like alumina, is pneumatically transported vertically from the hold of a ship, other vessel, or the like container; and after it has been transported vertically a distance, another section of the apparatus conveys the material or cargo generally horizontally to a collection point.

The present invention concerns an elevating and conveying system and a method for the unloading of materials, particularly particulate materials, from vessels, ships, or the like containers.

In this description, pneumatic transport means the conveying of particulate material solely by means of a high velocity moving gas which entrains the particles. This does not include a fluidized chute. In a vertical pipe, the moving gas alone lifts, entrains, carries and conveys the material. There are known pneumatic transport systems which employ a moving gas flow to suck cargo from a ship's hold, to elevate the cargo, and to blow the cargo through a direction changing bend in the pneumatic transport which bend may be at approximately 90° or even at a greater angle. Following the bend, the cargo is blown by the same moving gas flow along a normally approximately horizontal or sloping path into a gas-particulate material separator. See U.S. Pat. No. 2,620,236, for example. Hence, pneumatic transport operates along the entire cargo or material transport pathway from the ship's hold, vessel, container or the like all the way to the remote gas-cargo separator. Such systems often transport particulate materials that have abrasive qualities and this damages the transport pipes, especially at the direction change bend.

Furthermore, along part of the pathway, such systems must convey the material along a more or less horizontal path. But, horizontal conveyance of particulates requires very high transport air velocities, for instance 25 meters per second or more, especially for heavy powders or other heavy particulate materials. Otherwise, the particulate materials settle at the bottom of the horizontal transport pipe and are not conveyed. With vertical transport, the air flow both supports and transfers the particles. But, with horizontal transport using a horizontal air flow, the air flow no longer supports the particles from beneath and a much greater air velocity is thus needed to effect horizontal transport. As a result, such known transport systems have their limits for reasons of both power consumption and excessive internal wear on the system.

One further drawback is that the capacity of these known systems is limited by considerations of the size and weight of the suction or moving gas flow line that can be used and the risk of clogging of the horizontal conveyor after change of direction due, for example, to pulsation in the horizontal transportation line.

SUMMARY OF THE INVENTION

The principal object of the present invention is to eliminate the aforesaid drawbacks of prior particulate materials conveying systems.

It is another object of the invention to provide a system and method to effectively convey materials first vertically and then horizontally.

It is a further object of the invention to effectively transport materials vertically pneumatically, and to avoid use of pneumatic transport for the horizontal conveyance of the horizontal conveyance of the materials.

It is yet another object of the invention to convey materials with minimal use of energy.

It is another object of the invention to convey materials with minimal wear of the interior of the conveying conduits.

The present invention comprises a system and method which effects vertical movement of particulate materials followed by horizontal movement of those materials, and wherein the vertical movement is by pneumatic transport, while the succeeding horizontal movement is by other than pneumatic transport. In preferred arrangements, the horizontal movement or transport is by means of a fluidizing conveyor or by a mechanical conveyor.

To accomplish the foregoing and other objects, the conduit or pipe used for vertical pneumatic transport is of a relatively smaller internal cross-sectional area, while the conduit or pipe for the horizontal transport is of a relatively larger internal cross-sectional area. The vertical pneumatic transport conduit and the horizontal transport conduit are joined at a bend. Because of the above noted conduit cross-sectional area differences, the same volume of air drawn through both the vertical and horizontal transport conduits moves with greater material moving force vertically and with lesser material moving force horizontally. In the preferred embodiments of the system, the air flow in the horizontal transport conduit performs no material moving function.

In a preferred system, the pneumatic transport conduit is in the form of an at least approximately vertical rise pipe and the succeeding horizontal transport conduit is in the form of an at least approximately horizontal pipe. The vertical and horizontal pipes meet and are joined at a bend, which may be flexible, or rigid but hinged, as the situation may require. This permits variations in the angle of meeting between the horizontal and vertical pipes, which could be especially valuable where one of these pipes is non-telescopable. In one preferred arrangement, particularly useful at a rigid joint between the vertical and horizontal pipes, the bend is comprised of an air velocity reducing, direction-changing expansion chamber which, in its preferred form, is at least larger in cross-sectional area than the narrower vertical pipe and is preferably larger in internal cross-sectional area than the relatively wide cross-sectional horizontal conduit.

For most efficient and effective operation, a single suction source is connected at the downstream end of the horizontal conduit, such that a single suction force, coupled with the design of the conduits and the intermediate expansion chamber, provides the air flow for moving the material to be conveyed.

The foregoing arrangement permits the negative pressure of suction to be available practically fully for the vertical transport stage. All of the particulate material to be transported is carried by pneumatic transport through the vertical conduit. Afterward, the air passes into and through the joining expansion chamber and through the horizontal conduit. In the latter conduit, the air is at a reduced velocity, substantially below that velocity that would be required to exert sufficient force to carry all of the now elevated particulate material or cargo along with the air flow. Thus, part of the particulate material that has travelled through the bend or expansion chamber into the horizontal conduit settles out of the air flow and onto the bottom of the horizontal conduit with the larger portion of this settling taking place just beyond the bend or expansion chamber. Although the air velocity in the horizontal conduit is insufficient to entrain or carry cargo, the air has some velocity, whereby the suspended material does not instantaneously and fully settle in the bend or expansion chamber or right at the entrance to the horizontal conduit. At least part of the particulate material that enters the horizontal conduit is entrained, forming a dust cloud, and the particulate material settles and deposits progressively along the bottom of the horizontal conduit, with some of the finest particles traveling the entire length of the horizontal conduit.

In the apparatus of the present invention, as in most conveyors of particulate material, there is an air filter at the end of the line after the collection point. One advantage of the invention is that practically all of the particulate material that enters the horizontal conduit settles to the bottom of that conduit before the suctioned air flow enters the filter. The filter separates any remaining cargo or dust from the air flow being exhausted. The separation of the bulk of the cargo or particulate material from the air flow before the air flow reaches the filter prevents overloading of the filter and makes the exhausting of the suction gas more efficient than would be the case in a conventional conveying system.

Because material that is to be conveyed horizontally has settled to the bottom of the horizontal conduit, means and a process for moving that material to the collection point at the end of that conduit is now required. Conveyor means is provided at the bottom of the horizontal conduit for conveying the settled particulate material to the collection point. A conventional mechanical conveyor might be employed. Alternatively, in a preferred arrangement, a fluidized bed is defined at the bottom of the horizontal conduit, and the particulate material that has settled out becomes fluidized by a fluidizing air flow, which reduces the cohesion between the particles of settled material. (For a further explanation of the effect of fluidization on particles, see *The Encyclopedia of Chemistry* (Reinhold Publ. Corp., New York 1957), p. 405.) This fluidized bed caused reduction in cohesion in turn enables the fluidized particles to flow in a stream through the horizontal conduit along the bottom thereof. To aid the flow of fluidized particles, the horizontal conduit preferably has a slight downward slope toward its outlet. The continuous, relatively quite slow, horizontal air flow toward the outlet filter carries the unsettled finest dust along the length of the horizontal conduit above the fluidized layer.

In summary, therefore, the inventive system and method has the following features: (a) The high suction force of the pneumatic transport is available to be used practically completely for the vertical pneumatic transport and is either completely unnecessary or very little of it is needed for horizontal transport. (b) Because there is no need for high velocity air flow to effect horizontal transport, this permits reduction of the air flow velocity in the vertical conduit to that level sufficient to entrain and lift the particles. The air velocity reduction minimizes vertical conduit erosion by particulate material. (c) Where the bend between the vertical and horizontal conduits is the direction changing expansion chamber between the vertical and horizontal transports, it provides direction change, airflow speed reduction and conduit erosion minimizing direction change. Changes of flow direction under high pressure pneumatic transport and all horizontal flow under high pressure and pneumatic transport is avoided. Hence, there is lower wear of the system, especially at the bend, particularly in the case of abrasive materials being conveyed. (d) The particulate material entering the horizontal transport conduit settles out of the air flow, mostly near the inlet of the horizontal conduit, whereby the air-cargo separator or filter need filter out only a minimal quantity of cargo particles from the air being exhausted. (e) A conveyor means is provided in the horizontal conduit for conveying the settled particulate material to the collection point, without relying upon the suction force that has been used for the vertical pneumatic transport. (f) Where fluidized horizontal conveying is used, the air required for fluidizing amounts to only about 10%, and sometimes as little as 5%, of the air required for lifting the material through the vertical conduit, whereby power consumption for fluidization is comparatively negligible. (g) It is possible with the same power to obtain approximately double the total throughput and collection of materials, while also subjecting the entire system to far less wear than known systems permit. (h) The present system is particularly useful for high capacity unloading. It has low power consumption as compared with known systems and has been found to consume as little as one-half the power of known systems for the same production rate. (i) The present system is suitable for powdery or fine grained fluidizable materials and is also suitable for granular non-fluidizable materials. There are other features of the invention.

A fuller understanding of the invention and how the objects of the invention are realized will be obtained from the following description of the accompanying drawings.

BRIEF DESCRIPTION OF THE DRAWINGS

FIG. 1 is a cross-sectional, elevational view of one form of elevating and conveying system in accordance with the present invention and which performs the process in accordance with the invention;

FIG. 2 is a cross-sectional view along the line of arrows A—A in FIG. 1 illustrating one form of the horizontal transport conduit of the invention;

FIG. 3 is an enlargement of the horizontal conveyor of FIG. 1;

FIG. 4 is a cross-sectional view along the line and in the direction of arrows 4—4 in FIG. 3;

FIG. 5 is a cross-sectional view in the direction of arrows 5—5 in FIG. 1 of a fragment of the system of FIG. 1;

FIG. 6 is the same type of view as FIG. 3 of a modified embodiment of the horizontal conveyor;

FIG. 7 is a cross-sectional view along the line and in the direction of arrows 7—7 of FIG. 6; and FIG. 8 is a cross-sectional view of the same type as FIG. 2 and showing yet another embodiment of horizontal conduit according to the invention.

DESCRIPTION OF THE PREFERRED EMBODIMENTS

Turning to FIG. 1, berthed alongside quay 1 is a vessel having a hull 3, the hold 5 of which is filled with a particulate or the like material 7 that is capable of trickling and that is suitable for pneumatic transportation. Such a material might be alumina or other powdery or granular or particulate material. Located on quay 1 is an unloading apparatus 9 according to the invention. The apparatus includes base support 10 which is movable onto and along the quay 1. Above base 10 is turntable 16 on which is carried the tower 15. Tower 15 is rotatable by means of turntable 16 with respect to the base 10. A horizontal pivot axis 13 is supported (by means not shown) on tower 15, and elongated jib 11 is vertically pivotable about axis 13.

Positioned on tower 15 is a blower 17 which provides the main suction force for drawing material 7 out of hold 5. Blower 17 is preferably a rotary, piston blower, although other types of blowers might be used. Blower 17 communicates with air filter chamber 20 of separator 19 through output pipe 21 and through safety filter 18. As shown in FIG. 5, air filter chamber 20 contains a plurality of filter elements 20a through which dust laden air passes. The filter elements may comprise automatic cleaning filter bags. Safety filter 18 removes dust or particulate material from the air flow exiting from filter chamber 20 if any of the filter elements in chamber 20 should malfunction. Furthermore, safety filter 18 may be provided with control equipment (not shown) for sensing and signalling such a malfunction. Hence, the exiting air flow from the outlet from blower 17 is clean. Air passing blower 17 exits to atmosphere past baffles, mufflers, silencers 135, or the like.

Separator 19 (FIGS. 1 and 5) is supported in tower 15. It is comprised of enlarged filter chamber 20 and a silo shaped section 23 which serves to collect the particulate materials. Beneath section 23 of separator 19 is located the particulate material outlet 24 which delivers material through a flexible and pivotable connection (not shown) to the conventional mechanical conveyor 25 mounted on support 10. Conveyor 25 conveys material to a conventional transfer station 27. Chamber 23 functions as an air lock to prevent air from being drawn into the separator 19 through the lower outlet 24 for the particulate material. The air lock in silo 23 is obtained, for example, by having outlet 24 throttled or controlled in a manner such that the particulate material 7 always reaches a certain air blocking and air flow resisting height or level in silo 23, thereby blocking air from flowing in through outlet 24 while the particulate material can fall or exits through that outlet.

Referring to FIGS. 1, 3 and 4, jib 11 is comprised of at least one elongated rail 29, which extends from the support pivot 13 in a generally horizontal direction. Atop and slidable on rail 29 is positioned the telescoping, horizontal transport conduit 30, which is comprised of two telescoping sections 31, 32. The outside diameter of section 31 and the inside diameter of section 32 are selected and their shapes are selected such that section 31 can telescope into and out of section 32 due to readjustment in the location in hold 5 of below described vertical suction pipe 41. Horizontal pipe section 32 has an outlet 132 into dust separator 19. The outlet end of pipe section 32 is supported at pivot axis 13 on the fixedly located pivot support 133. Horizontal conveyor pipe section 31 slidably rides along rail 29 as it telescopes.

Usually, both sections of pipe 30 would be round, but this is not required. The horizontal conveyor shown in FIGS. 1-4 is round. Quite important to the invention is the cross-sectional area of the interior of horizontal pipe 30 along its length, which area is related in the below-described manner to the cross-sectional area of the vertical, pneumatic transport conduit 40.

As outlined in the general description herein of the invention, to the inlet end of pipe 31 is connected the below described bend 39, which is illustrated as being in the form of expansion chamber 39. For the reasons discussed above, when air laden with particulate material enters the horizontal pipe 31, the air flow slows and the heavier particles begin to settle to the bottom of pipe 31. Where bend 39 is the illustrated expansion chamber, the settling begins in that chamber. Then the below described conveyor means should extend back into chamber 39 sufficiently to receive the particulate material settling out there. For example, in a typical installation, air passing through pipe 31 moves at a low velocity, on the order of 2-3 meters per second, for example. Because the heavier particles settle out of the air moving through conduit 30, that air is considerably cleaner when it enters and passes through separator 19 and filter chamber 20. Much less dust and particles, for instance only about 5% of the total particulate cargo in the situation where alumina is being conveyed, must be filtered out by the filters of chamber 20. This makes the present system much more efficient, and less subject to breakdown. The filters in chamber 20 need not be cleaned as frequently as corresponding filters in conventional systems. Furthermore, the overall size of filter chamber 20 may be smaller than corresponding chambers in conventional systems.

Some means is needed to transport the particulate material that has settled out at the bottom of horizontal conduit 30. In accordance with the first embodiment of the invention shown in FIGS. 1-4, a fluidizing means 100 is provided for fluidizing the particulate material in conduit 30 by reducing cohesion between the particles. The conduit 30 is slightly tilted down to its outlet 132, as shown in FIGS. 1 and 3. Gravity acts upon the fluidized layer and causes it to gradually flow through conduit 30. The particulate material in the form of a fluidized layer throughout its movement moves into the separator 19, wherein the material slides or falls into silo section 23. This travel avoids remixing the material in the fluidized layer with air of the main air stream and, most important, avoids overcharging of the filters of chamber 20.

Fluidizing means 100 can be understood from FIGS. 1-4. It includes conventional fan 35 which is located near the inlet to the air duct 33 to blow air to the left in FIG. 1. The air duct 33 extends nearly to the inlet end of transport conduit 30. Duct 33 carries air at a relative over pressure into conduit 30.

Although only a single outlet 33a from duct 33 into pipe 31 and only a single outlet 33b from duct 33 into pipe 32 are shown, in accordance with well known principles, a plurality of such outlets spaced along duct 33 and pipes 31 and 32 may be provided to ensure the necessary fluidization of materials along the entire conduit 30.

Supported in both of pipes 31, 32 and located slightly above the bottom of conduit 30 and extending along its entire length is a conventional air diffusing, air permeable fabric 34a, 34b which serves to distribute the air delivered by duct 33 beneath the fabric so as to establish a fludizing bed layer 7a just above the fabric near the bottom of conduit 30 and thus out of the main air flow through conduit 30. Each of pipes 31, 32 has its own respective fabric 34a, 34b which remains in place and functions when pipes 31, 32 telescope. Each pipe 31, 32 has its own fluidizing conveyor. The conveyor of pipe 31 feeds that of pipe 32.

The flow speed of the fluidized layer 7a toward separator 19 depends upon the slope of conduit 30 and is independent of the velocity of the main air flow through conduit 30.

Referring to FIG. 1, the air supply to duct 33 can be taken from any of a number of sources. Duct 33 may receive air from pipe 21. Fan 35 draws filtered air from the pipe 21 and delivers it to the underside of the horizontal transport conduit 30 below the air permeable fabric 34. The rising air stream fluidizes the material being conveyed, escapes from it and mingles with the horizontal air stream passing through conduit 30.

Duct 33, or its equivalent could instead receive air from the pneumatic conveying stream or, more properly, from the conduit 30. But air from conduit 30 must be filtered before being fed to the fluidizing devices. Alternatively, the duct 33 can communicate directly with the atmosphere through connecting duct 33' and conventional regulating valve 22. In a further variation of the invention, the bottom of conduit 30 could be provided with at least one and preferably a plurality of openings directly to the atmosphere and spaced along the conduit. The reduced air pressure within conduit 30 would draw enough air in through the openings at the bottom of conduit 30 to fluidize the material in that conduit.

Taking fluidizing air from the system, e.g. pipe 21, is preferable to taking it from the atmosphere. Usually, the system is under reduced pressure required for suction. But suction pressure within the system varies due to material quality variations, clogging, etc. and especially due to the movement and lifting of the nozzle 46 through the hold 5. However, fluidizing air should be at fairly constant pressure relative to the instant absolute value of the reduced pressure in the conduit 30. In order to achieve this while using fluidizing air from the atmosphere, the air must be drawn through regulating valves 22. On the other hand, system air, e.g. from pipe 21, for fluidization instantly varies in pressure correspondingly to the pressure variations of the system. Hence, a uniform quantity and flow rate of fluidizing air is provided to pipe 30 by means of fan 35. Fan 35 produces a constant pressure differential sufficient to overcome pressure drops in duct 33, across fabric 34a, 34b and across the settled material 7a to be fluidized.

Instead of fluidizing bed conveyance, as shown in FIGS. 6 and 7, the horizontal transport conduit 30' could make use of a conventional mechanical conveyor, such as the screw conveyor 141, 142. Each screw 141, 142 is supported in rotation bearings 143 at the bottoms of respective pipe 31' or 32' and each screw is connected to and driven by a respective motor 144. Screws 141, 142 are rotated to convey settled particulate material to outlet 132' and screw 141 feeds screw 142. With screw or other mechanical conveyance, the tilting of conduit 30 that is required for fluidized conveying, is not necessary.

As a further alternative, the mechanical conveyor may comprise an elongated conveyor belt type transport means 36 of FIG. 8 which extends the length of conduit 30'' to the collection outlet. When particulate material or cargo settles on belt 36, it is moved through conduit 30''. Side plates 38 guide the settled material onto the belt 36.

The mechanical conveyor may instead be a chain conveyor or a vibrating conveyor, etc.

Furthermore, since conduit 30' or 30'' or its equivalent in any other mechanical conveyor is usually telescoping, each section thereof would be provided with its own conveyor. The material is delivered from the conveyor in the upstream pipe 31', 31'' to the conveyor in the downstream pipe 32', 32'' and from there to the outlet. Means for operating any such mechanical conveyor are known in the art and are thus not shown.

Referring to FIGS. 1, 3 and 6, communicating between the inlet end of the horizontal conduit 30 and the outlet end of below described vertical conduit 40 is the joining bend 39, which may be a flexible tube, a simple bend, a rigid hinged tube arrangement or the illustrated quite large cross-sectional area, flow redirection and air flow velocity reducing, expansion chamber 39. The benefits of enlarging chamber 39 have been discussed in the general description above. Chamber 39 has a rounded interior surface 139 that is oriented to redirect air and cargo flow and that at its top extends above the top side of conduit 30. Conduit 40 feeds into the bottom of chamber 39, beneath interior surface 139. A small portion of the conveyed particulate material settles in chamber 39 because air flow speed reduces there. But the continuing air flow and additional entering material keeps that settling to a minimum. For recovering that small amount of material that settles in chamber 39, the above described conveyor means of conduit 30 can extend back into chamber 39 and begin there.

In all of FIGS. 1, 3 and 6, the vertical conduit 40 for pneumatic suction is comprised of the telescoping pipe sections 41, 43, with the outer diameter of the latter being small enough and the inner diameter of the former being large enough that the latter can be telescoped into the former. As with conduit 30, the shape of pipe sections 41, 43 is not critical, although they would usually be circular tubes. It is the cross-sectional area of the interior of conduit 40 over its entire length that is of great importance. The internal cross-sectional area of conduit 40 is smaller than the internal cross-sectional area of horizontal conduit 30. As a result, suction force is exerted by air flow through conduit 40 but the larger cross-sectional area of pipe 30 ensures that the same volume air flow produces no significant suction force in conduit 30.

The upper end of conduit 40 is carried on wheels 37, which ride rails 29 (see FIGS. 1-3), such that conduit 40 can be positioned over and hang approximately vertically over any spot in hold 5.

Referring to FIG. 1, at the lower end of pipe section 43 is the suction nozzle 46. Adjacent to nozzle 46 are arranged material feeding means 45 in the form of chain conveyors 47 or agitating discs or arms (not shown), for example, which feed the material 7 to be picked up evenly across the open end of nozzle 46. For residual discharge, there is a further conveyor 48 which collects the particulate material from the corners of the hold and feeds it to the feeding means 45.

The action of the system can be described as follows. Conveyors 47, 48 controlled from cab 50, for example, are moved around in the hold 5, thereby to convey the material to be transported to suction inlet nozzle 46. Owing to the action of blower 17, the pressure in suction nozzle 46 is negative, as compared with the atmospheric pressure in hold 5. Consequently, the material at nozzle 46 is drawn up by the air stream entering nozzle 46 and is sucked through conduit 40. This material is sucked and conveyed into direction changing, expansion chamber 39 above conduit 40. In enlarged chamber 39, the air velocity greatly diminishes and the air flow itself is redirected into and through conduit 30. The previously entrained material 7 is no longer supported by the air flow and it settles principally at the inlet end of pipe 31 of conduit 30, as schematically shown in FIGS. 3 and 6.

The now considerably lower velocity air traveling through conduit 30 at a rate, for example, of about 2–3 meters per second, passes, together with any dust entrained in the air, through outlet 132 into separator 19. In addition, that material that has settled in conduit 30 is conveyed by the above described fluidized bed, mechanical or the like conveyor through conduit 30 and out the outlet 132 to the separator 19.

The material that has been thus conveyed into the separator 19 falls into the air locked silo 23. The air that exits through exit 132, loaded perhaps with fine, lightweight dust, passes through the filter chamber 20, which is a rather enlarged cross-sectional area chamber which slows the airflow even further and causes most of the remaining dust to fall into the silo 23. From the filter chamber 20, the air flows through the safety filter 18 and then exits through the pipe 21 by action of the blower 17. From there, the air escapes through baffles, silencers, mufflers 135, or the like, into the atmosphere.

Owing to the telescoping construction of conduit 40, and the telescoping construction of horizontal conduit 30, it is easy to move the conduit 30 with the associated devices to any point by displacing pipes 31 and/or 32 along the jib 11. This also changes the position of chamber 39 and vertical suction conduit 40 which moves by wheels 37 along jib 11. (Compare the solid line and phantom positions of chamber 39 and pipe 31 in FIG. 3.) In this manner, the entire hold 5 can be easily reached and emptied.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

I claim:

1. An elevating and conveying system for unloading particulate materials from vessels, or the like, said system comprising:
    a source of vacuum;
    a first material transport conduit for being disposed approximately vertically in the vessel, or the like during unloading; said first conduit having an upper end and a lower end; a suction inlet orifice located at said first conduit lower end; an outlet at said first conduit upper end; said first conduit having an inside, free cross-sectional area along its entire length narrowed in relationship to the area of the conduit through which the suction force is supplied by said vacuum source such that the particulate material is pneumatically sucked through said first conduit by said vaccum source;
    a second material transport conduit disposed more horizontally and having an inlet at one end and having an outlet; said second conduit having an inside, free cross-sectional area along its entire length that is greater than said cross-sectional area of said first conduit; said cross-sectional area of said second conduit being related to the suction force supplied by said source of vacuum such that that said cross-sectional area is large enough to permit and cause particulate material to settle out of the air flow in said second conduit to the bottom of said second conduit;
    a joining bend joining said first conduit upper end outlet and said second conduit inlet;
    conveying means provided in said second conduit and located generally along the bottom of said second conduit thereby to receive particulate material that settles in said second conduit; said conveying means being designed and adapted for moving the settled particulate material toward said second conduit outlet; means communicating with said second conduit outlet for receiving the particulate material that has been conveyed through said second conduit by said conveying means, blown through said bend and sucked through said first conduit by said vacuum source.

2. The elevating and conveying system of claim 1, further comprising an air and particulate material separating arrangement located between said second conduit outlet and said particulate material receiving means.

3. The elevating and conveying system of claim 2, wherein said vacuum source is downstream of said separating arrangement, thereby to suck air and particulate material therethrough.

4. The elevating and conveying system of claim 3, wherein said air and particulate material separating arrangement comprises a separator, including means for separating entrained dust from the air entering said separator; an air outlet from said separator; a particulate material outlet from said separator.

5. The elevating and conveying system of claim 1, wherein said bend comprises an air flow velocity reducing and flow direction changing expansion chamber having one side connected to said first conduit outlet and another side connected to said second conduit inlet, whereby both said first and second conduits communicate into said expansion chamber; said expansion chamber having a larger cross-sectional area than at least said first conduit, thereby to reduce pneumatic flow velocity in said expansion chamber as compared with said first conduit.

6. The elevating and conveying system of claim 5, wherein said expansion chamber cross-sectional area is larger than said second conduit cross-sectional area.

7. The elevating and conveying system of claim 5, wherein said conveying means also extends into and from said expansion chamber.

8. The elevating and conveying system of claim 1, wherein said first conduit is telescopable to vary its length.

9. The elevating and conveying system of claim 1, wherein said second conduit is telescopable to vary its length.

10. The elevating and conveying system of claim 1, wherein said conveying means in said second conduit are mechanical conveying means for mechanically conveying particulate material along said second conduit.

11. The elevating and conveying system of claim 1, wherein said conveying means in said second conduit are fluidization conveying means, comprising at least one opening in the underside of said second conduit through which air is forced to produce a fluidized bed in said second conduit of the particulate material; means for delivering forced air to said underside openings in said second conduit.

12. The elevating and conveying system of claim 11, wherein at least one of said underside openings in said second conduit communicates with one of the components of said system that carries air under suction that is caused by said vacuum source, thereby to provide some of that air to those said communicating underside openings.

13. The elevating and conveying system of claim 12, further comprising an air and particulate material separating arrangement located between said second conduit outlet and said particulate material receiving means; said vacuum source being downstream of said separating arrangement, thereby to suck air and particulate material therethrough;
said at least one underside opening in said second conduit communicating with said system between said separating arrangement and said vacuum source.

14. The elevating and conveying system of claim 11, wherein said at least one underside opening communicates externally of said system, thereby to draw air into said system from the exterior thereof.

15. Method for elevating and conveying particulate materials from a vessel, or the like, comprising the steps of:
pneumatically sucking the material up substantially vertically by means of a suctioned air flow at a first air speed sufficient to suck the material along;
at the upper end of the vertical travel of the material, redirecting the air flow more horizontally and then slowing the air flow substantially below the first speed, in order to allow at least some of the particulate material to settle progressively out of the slowed air flow along a horizontal pathway therebeneath, conveying the material that has settled out of that flow toward a collection point;
and collecting the material at the collection point.

16. The method for elevating and conveying particulate materials of claim 15, wherein the same air flow both pneumatically sucks the material and also transports a part of the material on its substantially horizontal travel.

17. The method for elevating and conveying materials of claim 16, wherein the entire vertical and horizontal air flow is produced by a single suction source.

18. The method for elevating and conveying particulate materials of claim 15, comprising the further step of filtering the retarded air flow to remove particulate material still suspended in the retarded air flow and leading the removed particulate material to the collection point.

19. The method for elevating and conveying particulate materials of claim 15, wherein the particulate material that has settled from the retarded air flow along the horizontal pathway is mechanically carried and conveyed horizontally toward the collection point.

20. The method for elevating and conveying particulate materials of claim 15, wherein the particulate material that has settled from the retarded air flow along the horizontal pathway is fluidized by a fluidizing air flow to form a fluidized bed of the settled material and the fluidized bed of the material is conveyed to the collection point.

21. The method for elevating and conveying particulate materials of claim 20, wherein the horizontal pathway is tilted down toward the collection point and the fluidized bed of material is conveyed by gravity to the collection point.

22. The method for elevating and conveying particulate materials of claim 20, wherein the fluidizing of the material settled from the air flow is accomplished by air impinging upon the material from below.

23. The method for elevating and conveying particulate materials of claim 22, wherein the air for performing the fluidizing is extracted from the air flow before the collection point; prior to performing the fluidizing, the air is filtered.

24. The method for elevating and conveying particulate materials of claim 22, wherein the air which performs the fluidizing is sucked from the environment.

* * * * *